(12) United States Patent
Dash et al.

(10) Patent No.: US 12,536,450 B2
(45) Date of Patent: Jan. 27, 2026

(54) KNOWLEDGE GRAPH RULE INDUCTION

(71) Applicant: International Business Machines Corporation, Armonk, NY (US)

(72) Inventors: Sanjeeb Dash, Croton on Hudson, NY (US); Joao P. Goncalves, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 17/963,282

(22) Filed: Oct. 11, 2022

(65) Prior Publication Data

US 2024/0135205 A1  Apr. 25, 2024

(51) Int. Cl.
*G06N 5/02*  (2023.01)
*G06N 5/025*  (2023.01)

(52) U.S. Cl.
CPC .................................. *G06N 5/025* (2013.01)

(58) Field of Classification Search
CPC ......... G06N 5/025; G06N 5/022; G06N 20/00
See application file for complete search history.

(56) References Cited

U.S. PATENT DOCUMENTS

2019/0370302 A1   12/2019   Khaitan et al.
2020/0342055 A1*  10/2020   Patra ..................... G06N 3/048

FOREIGN PATENT DOCUMENTS

| CN | 109036546 A | 12/2018 |
| CN | 109213872 A | 1/2019 |
| CN | 110851614 A | 2/2020 |
| CN | 110888942 A | 3/2020 |
| CN | 111125318 B | 4/2021 |
| CN | 113360286 A | 9/2021 |
| CN | 113626612 A | 11/2021 |

OTHER PUBLICATIONS

Balazevic, Ivanna et al., "TuckER: Tensor Factorization for Knowledge Graph Completion", Proceedings of the 1st Adaptive & Multitask Learning Workshop, Jun. 15, 2019, 6 pages.

(Continued)

*Primary Examiner* — Charles R Kasenge
(74) *Attorney, Agent, or Firm* — Harrity & Harrity, LLP

(57) ABSTRACT

Mechanisms are provided for automated rule set generation for identifying relations in knowledge graph data structures. An input knowledge graph is processed to extract tuples representing relations between entities present in the input knowledge graph. A set of rules is generated based on one or more heuristics applied to tuples, and candidate rule(s) are identified that are candidates for adding to the set of rules. A linear programming computer model is evaluated for a modified set of rules comprising the set of rules and the candidate rule(s) to determine whether or not adding the candidate rule(s) improves an objective function of the linear programming model. The set of rules is expanded to include the candidate rule(s) in response to the evaluation of the linear programming computer model indicating that the addition of the candidate rule(s) improves the objective function of the linear programming computer model.

20 Claims, 4 Drawing Sheets

(56) References Cited

OTHER PUBLICATIONS

Bordes, Antoine et al., "Translating Embeddings for Modeling Multi-relational Data", In Advances in Neural Information Processing Systems, Dec. 5-10, 2013, 9 pages.

Cohen, William W. et al., "Fast Effective Rule Induction", Machine Learning: Proceedings of the Twelfth International Conference (ML95), Jul. 9-12, 1995, 10 pages.

Das, Rajarshi et al., "Go for a Walk and Arrive at the Answer: Reasoning Over Paths in Knowledge Bases Using Reinforcement Learning", Published as a conference paper at ICLR 2018, arXiv:1711.05851v2 [cs.CL], Dec. 30, 2018, 18 pages.

Dash, Sanjeeb et al., "Boolean Decision Rules via Column Generation", 32nd Conference on Neural Information Processing Systems (NEURIPS 2018), Dec. 2-8, 2018, 11 pages.

Dash, Sanjeeb et al., "LPRules: Rule Induction in Knowledge Graphs Using Linear Programming", arXiv:2110.08245v1 [cs.AI], Oct. 15, 2021, 19 pages.

Dettmers, Tim et al., "Convolutional 2D Knowledge Graph Embeddings", arXiv:1707.01476v6 [cs.:G] Jul. 4, 2018, 9 pages.

Eckstein, Jonathan et al., "An Improved Branch-and-Bound Method for Maximum Monomial Agreement", INFORMS Journal on Computing, vol. 24, No. 2, Spring 2012, Published online Jun. 17, 2011, 6 pages.

Goldberg, Noam et al., "Boosting Classifiers with Tightened $L_0$-Relaxation Penalties", Proceedings of the 27th International Conference on Machine Learning, Jun. 21-24, 2010, 8 pages.

Kearns, Michael J. et al., "Toward Efficient Agnostic Learning", Machine Learning, 17, 115-141 (1994), Nov. 1994, 27 pages.

Lacroix, Timothee et al., "Canonical Tensor Decomposition for Knowledge Base Completion", Proceedings of the 35th International Conference on Machine Learning 2018, arXiv:1806.07297v1 [stat.ML], Jun. 19, 2018, 12 pages.

Lin, Xi V. et al., "Multi-Hop Knowledge Graph Reasoning with Reward Shaping", Proceedings of the 2018 Conference on Empirical Methods in Natural Language Processing, Oct. 31-Nov. 4, 2018, 11 pages.

Qu, Meng et al., "RNNLogic: Learning Logic Rules for Reasoning on Knowledge Graphs", Published as a conference paper at ICLR 2021, arXiv:2010.04029v2 [cs.AI], Jul. 16, 2021, 21 pages.

Rocktaschel, Tim et al., "End-to-End Differentiable Proving", arXiv:1705.11040v2 [cs.NE], Dec. 4, 2017, 15 pages.

Sadeghian, Ali et al., "DRUM: End-To-End Differentiable Rule Mining On Knowledge Graphs", Preprint, accepted at NeurIPS2019, arXiv:1911.00055v1 [cs.LG], Oct. 31, 2019, 13 pages.

Shen, Yelong et al., "M-Walk: Learning to Walk over Graphs using Monte Carlo Tree Search", 32nd Conference on Neural Information Processing Systems (NeurIPS 2018), arXiv:1802.04394v5 [cs.AI], Dec. 18, 2018, 17 pages.

Sun, Zhiqing et al., "RotatE: Knowledge Graph Embedding by Relational Rotation in Complex Space", Published as a conference paper at ICLR 2019, arXiv:1902.10197v1 [cs.LG], Feb. 26, 2019, 18 pages.

Trouillon, Theo et al., "Complex Embeddings for Simple Link Prediction", Proceedings of the 33rd International Conference on Machine Learning 2016, arXiv:1606.06357v1 [cs.AI], Jun. 20, 2016, 12 pages.

Yang, Fan et al., "Differentiable Learning of Logical Rules for Knowledge Base Reasoning", 31st Conference on Neural Information Processing Systems (NIPS 2017), arXiv:1702.08367v3 [cs.AI], Nov. 17, 2017, 10 pages.

Yang, Bishan et al., "Embedding Entities and Relations for Learning and Inference in Knowledge Bases", Published as a conference paper at ICLR 2015, arXiv:1412.6575v4 [cs.CL], Aug. 29, 2015, 12 pages.

Yang, Hongyu et al., "Scalable Bayesian Rule Lists", Proceedings of the 34th International Conference on Machine Learning (PMLR 70, 2017), Aug. 6-11, 2017, 10 pages.

* cited by examiner

KNOWLEDGE GRAPH RULE INDUCTION

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): "LPRules: Rule Induction in Knowledge Graphs Using Linear Programming", Sanjeeb Dash, Joao Goncalves, arXiv:2110.08245v1 [cs.AI], Oct. 15, 2021.

BACKGROUND

The present application relates generally to an improved data processing apparatus and method and more specifically to an improved computing tool and improved computing tool operations/functionality for knowledge graph rule induction.

Knowledge graphs (KGs) are used to represent a collection of known facts via labeled directed edges. Each node of the graph represents an entity, and a labeled directed edge from one node to another indicates that the pair of nodes satisfies a binary relation given by the edge label. A "fact" in the knowledge graph may be represented as a tuple data structure, such as a triplet of the form (a, r, b) where a and b are nodes, and r is a binary relation labeling a directed edge from a to b indicating that r(a, b) is true. As an example, consider a KG where the nodes correspond to distinct cities, states, and countries and the relations are one of capital_of, shares_border_with, or part_of. A fact (a, part_of, b) in such a graph represents a directed edge from a to b labeled by part_of, implying that a is part of b.

Practical KGs do not contain all facts that are known to be true and that can be represented using KG entities and relations. Some "knowledge acquisition" tasks that are performed to generate or extract implied information from KGs include knowledge graph completion (KGC) tasks. KG completion involves analyzing known facts in a KG and using these to infer additional (missing) facts. One approach for KGC is to learn first-order logic rules that use known facts to imply other known facts, and then use these to infer missing facts.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided that comprises processing an input knowledge graph data structure to extract tuples representing relations between entities present in the input knowledge graph. The method further comprises generating a first set of rules based on one or more heuristics applied to tuples, and identifying one or more candidate rules that are candidates for adding to the first set of rules. The method also comprises evaluating a linear programming computer model for a modified set of rules comprising the first set of rules and the one or more candidate rules to determine whether or not adding the one or more candidate rules improves an objective function of the linear programming model. In addition, the method comprises expanding the first set of rules to include the one or more candidate rules in response to the evaluation of the linear programming computer model indicating that the addition of the one or more candidate rules improves the objective function of the linear programming computer model, to thereby generate a second set of rules.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
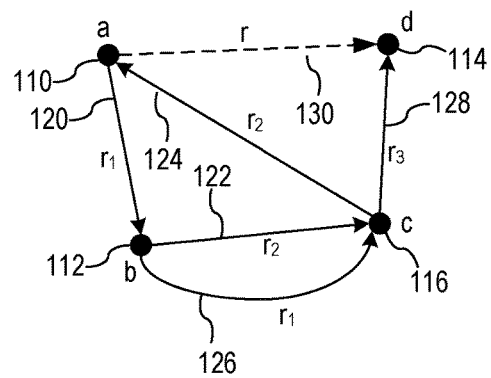
FIG. 1 shows an example of a simplified knowledge graph for purposes of illustrating nodes, edges, and missing relations.

As noted above, knowledge graphs (KG) provide a way of representing facts in a manner that can be processed by computing systems, such as artificial intelligence (AI) computing systems. For example, KGs may be used as input to machine learning computer models, both during training of the machine learning computer models, and during runtime execution on new input, to train the machine learning computer models to recognize patterns of input data and generate classifications, predictions, and the like, based on the recognized patterns. KGs may be used to represent vocabularies for natural language processing computer operations, ontologies of entities and relationships for computer based content searching, reasoning, and the like, via intelligent search computing tools, AI or cognitive computing systems, such as IBM® Watson™ available from International Business Machines Corporation of Armonk, New York, or the like. Moreover, KGs may be used as a basis for rule based AI computing systems, where the KGs may be used to define rules that may be applied to new data and thereby extract, based on these rules, new relations between entities that may have not been previously represented in the KGs. It should be appreciated that references to "knowledge graph" or KG herein are intended to reference the data structure(s) that define the knowledge graph or KG, as the illustrative embodiments are specific to an improved computing tool and improved computing tool operations/functionality.

However, these mechanisms are often limited by the facts represented in the initial input KGs which are generated by manual subject matter expert (SME) efforts. That is, it is not practical, through manual effort, to represent all relations between all entities in the initial input KGs. Thus, the machine learning and rule generation may be initially limited in that the entity types and relations that the machine learning computer models are trained on, or the rules that are generated, etc., are tied to the facts represented in the manually generated initial KGs which represent incomplete knowledge, as it is not feasible for human beings to codify complete knowledge of facts of a particular area of knowledge.

KG completion is a one technique in artificial intelligence (AI) and machine learning technologies to augment the limited representation of knowledge in input KGs. Rule based methods and embedding based methods may be used to expand upon the knowledge of an input KG. Embedding based methods, while providing reasonable accuracy and scalability, are only good for transductive reasoning, i.e., reasoning from observed, specific (training) cases to specific (test) cases involving previously seen entities, and do not provide good results for inductive reasoning (drawing conclusions by going from specific cases to general cases where the latter involves entities not previously seen). Moreover, as the embedding based methods utilize machine recognizable embeddings and scoring, the model is not interpretable by human beings, e.g., human beings do not easily understand vectors of numerical values.

Rule-based methods, on the other hand, provide mechanisms that support inductive reasoning and interpretable models, but have lower levels of accuracy compared to embedding methods. With a rule-based method, mechanisms learn first-order logic rules that capture existing facts in an input graph and then use these rules for reasoning about missing facts. For example, FIG. 1 shows an example of a simplified knowledge graph in which nodes 110-116 represent entities and edges 120-128 represent relations between entities. A "fact" may be represented as a tuple data structure, such as (a, $r_1$, b), where a is a first entity (or node), b is a second entity (or node), and $r_1$ is the relation between a and b, in the direction from a to b. A rule may be a combination of multiple tuples into rule clauses that lead to a rule conclusion, which may be one or more other tuples that specify a missing relation. For example, as shown in FIG. 1, the KG may have a missing relation (a, r, d) 130 which may be discovered through the application of learned rules, e.g., $r_1(a, b)$ and $r_2(b, c)$ and $r_3(c, d) \rightarrow r(a, d)$. A major drawback of such rule based methods is the lack of scalability to large datasets.

The illustrative embodiments provide an improved computing tool and improved computing tool operations/functionality that includes a linear programming (LP) model, which is a model that defines a linear objective function representing the error of a weighted collection of rules, and seeks to minimize the linear function, to thereby select rules from their assigned weights, through an iterative process of expanding a rule set and evaluating the improvement to the rule set achieved through the incorporation of new rules. In some illustrative embodiments, a relatively small initial candidate list of rules is used with column generation techniques (which is a way of iteratively generating new candidate rules) to add more rules, and thereby automatically expand the set of rules, in order to improve the LP model objective function. To foster interpretability and generalizability, constraint criteria are provided to limit the set of rules and tune the complexity hyperparameter(s) for individual datasets.

In the present description, the LP model is a computer executable model comprising constrains and objective function, such as described hereafter with regard to equations (3)-(6) as an example, which is applied to a given or input knowledge graph (KG). The application of the LP model to the given or input KG is referred to as a "linear programming problem" or LP problem. An LP solver may take the LP problem (LP model with specific numerical values from the KG and the like), and generates one or more solutions based on the LP model. Thus, the LP model may be evaluated on the given/input KG.

With the mechanisms of the illustrative embodiments, given any input collection of candidate rules, the LP model (or solving the LP problem for the input rules) yields weights for each rule. Nonzero weights indicate which of the candidate rules should be used. In addition, solving the LP problem also yields dual variable values, described hereafter, which can be used to decided which new candidate rules (from a new input list) have the potential to improve the objective function value of the LP model.

Thus, for example, an initial set of candidate rules is generated, an associated LP problem is solved, and the generated dual variable values are used to select from a new list of rules which ones to use and then augment the original set of candidates with these rules. This process may be repeated multiple times. In the final iteration, the nonzero variable values (e.g., of $w_k$ described hereafter) are used to select a final output set of rules and their weights (given by the nonzero variable values).

Thus, the LP model of the illustrative embodiments receives, as input, a knowledge graph, portions of which may be split into a training set, a test set, and a validation set. The LP model also receives as input hyperparameter input values, e.g., max complexity, negative path penalty, etc. The LP model sets up an initial LP model per relation in the training set, and then performs column generation or otherwise solves a sequence of LPs. Linear programming, or LP, refers to a mathematical optimization technique in which a linear function of a collection of variables is minimized (or maximized) subject to the variables satisfying several linear inequality constraints. If one wants to model a particular problem using linear programming, one writes a linear programming model for that problem. As described herein, in accordance with some illustrative embodiments, a linear programming model, as described hereafter with regard to equations (3) to (6), may be used to model knowledge graph rule induction for one relation. Thus, when the present description references "solving a sequence of LPs", or "solving an LP", refers to solving the linear programming problem. That is, what is meant is that the model, such as the one described by equations (3) to (6) in some illustrative embodiments, together with a specific knowledge graph, is used along with linear programming software to solve that problem, where the problem consists of the model (e.g., the model defined by equations (3) to (6)) and the data (e.g., the specific knowledge graph).

A final LP solution gives the chosen rules and weights of these rules, where the weights are the output of the LP problem that is solved and are the values taken by the variables $w_k$ in the model, e.g., equations (3) to (6) hereafter in one example embodiment. Each selected rule has an associated positive weight. These rules and their associated weights can be used thereafter for prediction purposes. The best setting for the hyperparameters are chosen via a validation set and the chosen rules are applied to the test set.

That is, with regard to the LP model, for each relation r, the linear programming model has one variable $w_k$ per candidate clause $C_k$, (where a clause is a left hand side portion of a rule that sets the criteria for satisfying the rule) and one variable $\eta_i$ for every edge $e_i=(t_i, h_i) \in E_r$, where $E_r$ is the set of edges of type r (e.g., "capital_of"), i.e., having a label corresponding to r, $(t_i, h_i)$ is the ith directed edge in $E_r$ from tail entity $t_i$ to head entity $h_i$, K is a set of all possible rules of length≤L, $C_k$ is the clause for rule k∈K and $a_{ik}=C_k(t_i, h_i)$. Solving the LP is to find the values of all variables $w_k$ and $\eta_i$ such that the LP objective function is minimized. If an edge $e_i$ is not "covered", i.e., there are not any rules in the solution which imply edge $e_i$, then the variable $\eta_i=1$ and works as a penalty in the objective function. It should be noted that after minimizing the objective function, if all variables $\eta_i$ are 0, this means that all edges $e_i$ are "covered", i.e., there are rules in the solution which imply the corresponding edge $e_i$.

Solving the LP model comprises generating an initial set of rules and then repeatedly selecting new rules to include in the set of rules based on whether or not the new rule improves the LP cost value. A rule is comprised of a clause and an implied relation. A clause $C_k$ is a conjunction of relations in a rule k. For example, in an example rule of capital_of(X,Y) and part_of(Y,Z) and part_of(Z,W)→part_of(X,W), the clause is capital_of(X,Y) and part_of(Y,Z) and part_of(Z,W) and the implied relation is part_of(X,W). Thus, if capital_of(X,Y) is true, and part_of(Y,Z) is true, and part_of(Z,W) is true, then part_of(X,W) is true. Clauses are generated by combining relations from an input knowledge graph. Thus, for example, if a knowledge graph contains only the relations capital_of and part_of, the following clauses of different sizes may be generated by combining these two relations:

2 possible clauses of size 1:
capital_of(X,Y)
part_of(X,Y)
4 possible clauses of size 2:
capital_of(X,Y) and capital_of(Y,Z)
capital_of(X,Y) and part_of(Y,Z)
part_of(X,Y) and part_of(Y,Z)
part_of(X,Y) and capital_of(Y,Z)
8 possible clauses of size 3 and they are:
capital_of(X,Y) and capital_of(Y,Z) and capital_of(Z,W)
capital_of(X,Y) and capital_of(Y,Z) and part_of(Z,W)
capital_of(X,Y) and part_of(Y,Z) and capital_of(Z,W)
capital_of(X,Y) and part_of(Y,Z) and part_of(Z,W)
part_of(X,Y) and part_of(Y,Z) and part_of(Z,W)
part_of(X,Y) and part_of(Y,Z) and capital_of(Z,W)
part_of(X,Y) and capital_of(Y,Z) and part_of(Z,W)
part_of(X,Y) and capital_of(Y,Z) and capital_of(Z,W)

In general, if the input knowledge graph has n relations, there are $n^l$ possible clauses of size l. Since the possible number of clauses can be very large, the two heuristics (e.g., generate rules of length 1 and 2, and then adding rules with shortest path between $t_i$ and $h_i$) are used to generate a "good" initial set of rules.

A column generation operation may be implemented to speed up the solution of the LP model. While a column generation operation is described as part of the illustrative embodiments for purposes of increasing the speed by which the operations are performed, the illustrative embodiments are not limited to using a column generation operation. For example, in some illustrative embodiments, an LP solver algorithm, or "LP Solver", may be used and provided with the LP model, e.g., equations (3) to (6), where the LP solver generates the solution to the LP problem comprising the LP model and knowledge graph.

With regard to the LP problem, a row in the clause-edge matrix corresponds to a constraint associated with an edge $e_i$. Values for $a_{ik}$ (coefficient of variable $w_k$ in constraint i) are set forth in each element of the matrix, i.e., the value of $C_k(t_i, h_i)$, is set to 1 if there is a path between $t_i$ and $h_i$, and is set to 0 otherwise. New columns may be added to the clause-edge matrix for newly generated clauses, i.e., combinations of relations, with corresponding weight variables w.

While FIG. 3 will be described in greater detail hereafter, for purposes of an initial understanding of the column generation operation, it is helpful to provide an overview of the process shown in FIG. 3, which illustrates one example embodiment of a column generation operation approach, specifically with regard to steps 314 to 322 in FIG. 3. In step 314, an initial set of rules is generated and in step 316, the linear programming problem is generated using those rules, which is then solved by calling an LP Solver. In step 318, the values of the dual variables provided by the LP Solver in step 316 are taken and new rules are generated. New rules may be generated by sorting edges by decreasing dual variable values, as discussed hereafter, and then, for each edge $e_i$ between $t_i$ and $h_i$, applying a shortest path heuristic and computing a reduced cost function. If the reduced cost function results in a value less than 0, i.e., adding the rule corresponding to the shortest path may reduce the LP solution cost of the rule set, then this rule is added to the rule set. Thus, by performing a column generation operation, new rules may be generated and added to the initial rule set when their addition has the potential to improve the LP solution, and this may be done through an iterative process to thereby expand the initial rule set to a final rule set which is limited in size, and in which the rules of the final rule set are limited in complexity so that they are interpretable.

In step 320, the rules generated in step 318 are added to the initial linear programming problem (the one generated in step 316). The updated linear programming problem is then solved by again calling the LP Solver. In step 322, it is determined whether more rules are to be generated. In case the answer is yes, the operation goes back to step 318, takes the values of the dual variables provided by the LP Solver in step 320 and follows the above procedure to generate new rules. In step 320, the newly generated rules are added to the previous linear programming problem (the one generated in the previous call to step 320) and the updated LP problem is again solved by calling the LP Solver. This process may be repeated until the answer in step 322 is no.

It should be appreciated that the column generation operation is only one possible way of solving the LP problems and generating new rules, and other solutions that provide iterative addition of rules to the initial rule set based on whether they improve the LP cost or not may be used without departing from the spirit and scope of the present invention. Moreover, while embodiments will be described assuming the two heuristics for establishing an initial set of rules and a modification of the second heuristic to add new rules, the illustrative embodiments are not limited to such, and other heuristics may be used without departing from the spirit and scope of the present invention.

Through the above process, rules for identifying relations in knowledge graphs may be generated through an automated process based on an input knowledge graph and an initial set of rules extracted from the input knowledge graph. The rule generation is made efficient and feasible, given the large number of variables, by implementing rule set size and complexity constraints and using a column generation operation to quickly identify, through a linear programming problem solving process of iteratively adding new rule clauses and corresponding rules. The generated rules may then be applied to the input knowledge graph and other knowledge graphs to identify relations that may be missing from the knowledge graphs, notify authorized users of these missing knowledge graphs, and in some cases automatically modify or update the knowledge graph to incorporate new relations between entities that were not previously present in the knowledge graph.

For example, consider the example KG mentioned previously, where the nodes correspond to distinct cities, states, and countries, and the relations are one of capital_of, shares_border_with, or part_of. An example fact (a, part_of, b) in such a graph represents a directed edge from a to b labeled by part_of, implying that a is part of b. With the mechanisms of the illustrative embodiments, by performing KG completion operations, a rule of the type capital_of(X, Y)→part_of(X,Y) may be learned, where X, Y are variables that take on entity values, and where the rule indicates that if X is the capital of Y, then X is part of Y. Having learned this rule, the illustrative embodiment may find pairs of entities, e.g., entities P, Q, such that (P, capital_of, Q) is a fact in the KG, and thus, it can be inferred that (P, part_of, Q) is also true given the learned rule above, and the set of facts in the KG may be augmented with this newly learned fact if not already present in the KG, i.e., the KG data structure may be updated to include this tuple, and thus, an edge of type part_of, between entities P and Q.

More complex rules may also be learned, where the rules may have any suitable length, such as by combining first-order rules into more complex patterns of relations linked by logical operators that define "clauses", where a clause comprises one or more relations between entities that imply a relation result, e.g., in the rule above, capital_of(X,Y) is a clause implying the relation result part_of(X,Y). Thus, for example, a more complex rule of length two may be of the type capital_of(X,Y) and part_of(Y,Z)→part_of(X,Z), meaning that if X is the capital of Y, and Y is part of Z, then X is part of Z. Again, applying this learned rule to entities P and Q, if there exists a third entity H, such that capital_of (P, H) is a fact in the graph, and so is part_of(H, Q) then it can be inferred that P is contained in Q. Instead of learning one rule for a relation, however, a weighted linear combination of rules may be learned as a proxy for a disjunction of rules, with larger weights indicating more important rules.

The illustrative embodiments provide an improved computing tool and improved computing tool operations/functionality to learn these logical rules for knowledge graph reasoning. The mechanisms of the illustrative embodiments operate based on combining rule generation with solving linear programs (LPs), and avoids the solution of difficult non-convex optimization methods inherent in neuro-symbolic methods, or other probabilistic methods.

The illustrative embodiments provide a linear programming (LP) based computer model with exponentially many variables corresponding to first-order rules and associated weights. Non-zero variables $w_k$ values correspond to selected rules and their weights. Rather than solving this exponential-size LP model, however, the illustrative embodiments deal with the exponential number of variables/rules by performing linear optimization column generation operations. The linear optimization column generation operations start with an initial small set of rules and associated variables, e.g., $w_k$, obtained through one or more heuristics described hereafter, and finds the best subset of these rules and associated weights via the solution of n LP problem defined on the initial set of rules. That is, the column generation process starts with the initial set of rules and calculates the corresponding weights by solving an LP problem. Then, the column generation process iteratively adds new rules and re-solves the LP problem associated with the augmented set of rules to generate new weights and determines, based on these new weights, which of the new rules best augment the existing set of rules, e.g., the best set of rules is one that minimizes the objective function, e.g., in some illustrative embodiments, the objective function is as shown in equation (3) described hereafter, or the like. Using column generation provides for a relatively fast solution to rule generation based on knowledge graph input that avoids the exponential variable issues.

The resulting augmented set of rules may be used to identify missing relations in input knowledge graphs by applying the set of rules to the input knowledge graph and discovering missing or new relations corresponding to these rules based on the characteristics of the nodes and edges actually present in the input knowledge graph. The input knowledge graph may then be updated or modified to include such relations, making missing or new relations explicitly represented in the knowledge graph data structure, or other outputs may be generated for authorized users to inform them of the potential for missing relations so as to facilitate decision making or the like.

In order to improve interpretability of the rules that are included in the set of rules, constraints are imposed on the rules to limit the number of rules and the number of relations per rule. That is, interpretability is important when authorized users are reading the resulting rule set to determine what relations each rule corresponds to. A user presented with a set of a rules where the rules have a limited number of relations per rule will be able to interpret the meaning of those rules more easily than if the same user is presented with a set of rules where the rules may have many relations. For example, the rule capital_of(X,Y)→part_of(X,Y) is easier to understand than the rule capital_of(X,Y) and part_of(Y,Z) and part_of(Z,W)→part_of(X,W). More concretely, an example of this first rule may be capital_of (Harrisburg, Pennsylvania)→part_of(Harrisburg, Pennsylvania), while an example of the second rule may be capital_of(Harrisburg, Pennsylvania) and part_of(Pennsylvania, USA) and part_of(USA, North America)→part_of (Harrisburg, North America).

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool.

For example, the improved computing tool of the illustrative embodiments specifically provides improved operations and functionality for generating rules for expanding knowledge represented in knowledge graph data structures by discovering missing relations between entities in the knowledge graph and presenting the discovered missing relations for evaluation by authorized users or otherwise automatically modifying or updating the knowledge represented in the knowledge graph data structure by incorporating the discovered missing relations as actual relations in the updated/modified knowledge graph data structure. The update/modified knowledge graph data structures make explicit facts that were not previously explicitly represented in the knowledge graph data structure. That is, with the mechanisms of the illustrative embodiments, the knowledge graph becomes more complete by analyzing known facts and using these known facts to infer missing facts which can then be added to the knowledge graph data structure to thereby update the knowledge graph to represent a more complete understanding of the knowledge represented therein with regard to the specific entities and their relationships. This improves the quality of the knowledge graph and improves the functionality of downstream computer operations that are dependent upon the knowledge represented in the knowledge graph.

For example, the improved knowledge graph data structure generated through the operation of the illustrative embodiments may be provided as input to one or more downstream computing systems that make use of the knowledge in the knowledge graph as a basis for performing their complex computing operations. For example, such knowledge graphs may be used as a basis for performing natural language processing operations, search operations, cognitive computing based question answering, fraud detection operations, and the like. For example, various ones of one or more artificial intelligence (AI) or machine learning computer models may receive the improved knowledge graph data structures generated through the mechanisms of the illustrative embodiments and use them to perform machine learning training and/or runtime classification, prediction, or machine learning support for decision making operations. For example, the expanded knowledge in the updated/modified knowledge graph data structure provides improved training and testing data for machine learning training operations and testing of the machine learning training, and thereby improves the resulting trained machine learning computer models that are generated based on the updated/modified knowledge graph data structure.

The improved computing tool implements mechanism and functionality, such as knowledge graph processing logic, rule induction logic based on linear programming, and the like, which cannot be practically performed by human beings either outside of, or with the assistance of, a technical environment, such as a mental process or the like. The improved computing tool provides a practical application of the methodology at least in that the improved computing tool is able to specifically expand knowledge graph data structures that are the basis for various downstream computer operations including natural language processing, search operations, cognitive computing based question answering, fraud detection operations, training and runtime operation of artificial intelligence and machine learning computer models, and the like.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
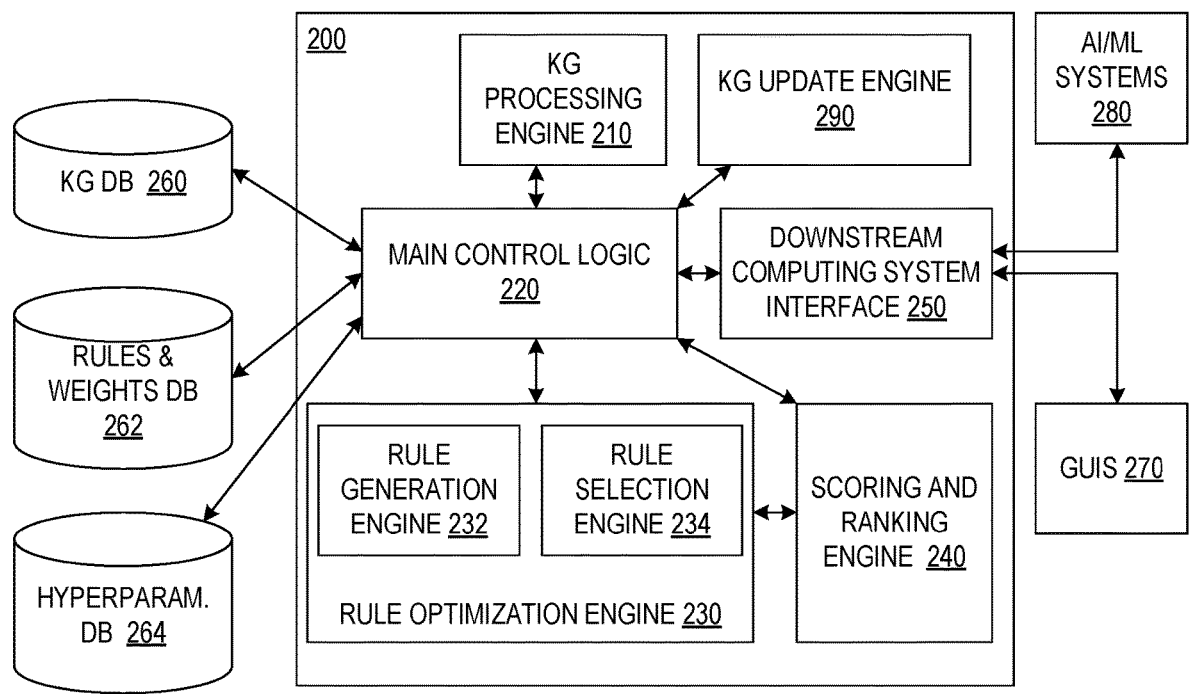
FIG. 2 is an example block diagram of the primary operational elements of a knowledge graph rule induction engine in accordance with one illustrative embodiment.

The following description of illustrative embodiments will first provide a description of the primary operational elements of an improved computing tool and its corresponding operations/functionality. Thereafter, a more detailed algorithmic description will be provided in support of the improved computing tool operations/functionality described. It should be appreciated that the operational elements shown in the figures, and the operations/functionality herein described are performed by specifically configured computing devices, either through specialized hardware logic and/or software loaded into memory and executed by one or more processors of the computing devices to specifically configure those computing devices for the specialized purpose of performing the operations of one or more of the illustrative embodiments of the present invention in an automated manner. These operations and functionality operate on knowledge graphs and perform linear programming based rule induction from these knowledge graphs in a manner that is not practical to be performed by human beings either as a mental or manual process, or as any method of organizing human activity. To the contrary, the illustrative embodiments are specifically directed to an improved computing tool and improved computing tool operations/functionality that is specifically directed to improving the knowledge graph data structures by providing a way of inferring missing facts from known facts in the knowledge graph, which improves the knowledge graph data structure and thereby further improves the represented knowledge upon which downstream artificial intelligence and machine learning computer systems perform their operations FIG. 2 is an example block diagram of the primary operational elements of a knowledge graph rule induction engine in accordance with one illustrative embodiment. As shown in FIG. 2, a linear programming based rule induction (LPRI) computing tool 200 comprises a knowledge graph (KG) processing engine 210, main control logic 220, a rule optimization engine 230, a scoring and ranking engine 240 and a downstream computing system interface 250. The rule optimization engine 230 comprises further operational elements of a rule generation engine 232 and a rule selection engine 234. The scoring and ranking engine 240 computes metrics to access how well the rules and weights chosen by the rule optimization engine 230 do when applied to a test dataset, e.g., a test portion of the input knowledge graph.

The LPRI computing tool 200 operates on data structures 260-264 to perform operations for inductively, and automatically through the machine learning logic of the illustrative embodiments, learning rules for identifying relations in knowledge graphs by building a set of rules from an initial set of rules extracted from an input knowledge graph and using linear programming techniques to evaluate the generated rules to determine whether they should be included in the final set of rules based on their effect on an objective function or cost function of the linear programming solution. These input databases or data structures 260-264 may include one or more knowledge graph (KG) databases or data structures 260, a rules and weights database 262, and a hyperparameters database 264. The KG databases or data structures 260 may provide input knowledge graph data structures, or portions of knowledge graph data structures, that may be used as training input data for learning rules and testing data structures for testing the generated set of rules. Once a final set of rules is generated, this final set of rules may be applied to the same, or other, knowledge graph data structures to identify missing or unrepresented relations between nodes (entities) in the knowledge graph.

The LPRI computing tool 200 generates a final set of rules which may then be provided to the downstream computer system interface 250 to provide these results to one or more downstream computing systems 280. In some illustrative embodiments, this may involve generating a user interface that presents the final set of rules to an authorized user for review. In some illustrative embodiments, this may involve updating the input knowledge graph by applying the final set of rules to the nodes and edges of the input knowledge graph and generating a user interface to present the updated knowledge graph to an authorized user or other artificial intelligence (AI) or machine learning computer model system. Such updating of the knowledge graph may be performed by the LPRI computing tool 200 by the main control logic 220 applying the final rule set to an input knowledge graph, or by other downstream computing systems based on the output of the final rule set by the LPRI computing tool 200 to the downstream computing systems.

For example, in some illustrative embodiments, the input knowledge graph may be updated to include relations that were previously missing from or not represented in the knowledge graph but were discovered through application of the final set of rules to the knowledge graph, and this updated knowledge graph may then be output to machine learning training logic and one or more machine learning computer models to thereby train those machine learning computer models based on the updated knowledge graph. In this way, the machine learning computer models may be trained on relations that were previously not present in the knowledge graph and thus, the machine learning training of the machine learning computer models is improved. Other implementations of the final rule set to improve downstream computing system operations and present useful and concrete results for decision making, may be provided without departing from the spirit and scope of the present invention.

During a training operation in which the LPRI computing tool 200 is learning a final set of rules for application to knowledge graphs, the LPRI computing tool 200 receives an input knowledge graph or KG (a very simplified version being shown in FIG. 1 for illustration purpose but in reality would have many hundreds or thousands of entities and edges) from the KG database(s) 260 as a training dataset and/or test dataset, as well as an initial set of hyperparameter values from the hyperparameters database 264. These hyperparameters may include, for example, a maximum complexity hyperparameter κ that specifies the maximum sum of the complexity of the individual rules selected by the system, where the complexity of a rule is the number of relations that may be included in the clause of the rule plus one, and a negative path penalty hyperparameter τ that represents a tradeoff between how well the weighted combination of rules performs on the known facts and how poorly it performs on negative paths, which are paths connecting a tail node t to a head node h using rule k for which there is no direct edge between t and h with relation r. These hyperparameters may be optimized through the learning process, as described hereafter. A discrete number of possible values for each of the hyperparameters is provided in the hyperparameters database 264 and each possible combination of hyperparameters' values is used to obtain the corresponding optimal set of rules and weights. The combination of hyperparameters' values that leads to the best set of rules and weights measured by MRR on the validation set is the one used in finding the final set of rules and weights.

The main control logic 220 provides the libraries, operating system, and underlying logic and data structures for facilitating the operations and interactions between the other elements of the LPRI computing tool 200. The KG processing engine 210 receives the input knowledge graph from the KG database 260 and processes the knowledge graph to extract the tuple representations for the entity relations represented in the input knowledge graph, e.g., tuples of (t, r, h), such as (Dallas, capital_of, Texas), (Texas, part_of, USA), (USA, part_of, North America), etc. The KG processing engine 210 may also extract other information from the knowledge graph that represents the hierarchical structure or pathways present in the knowledge graph. These tuples and graph structure information are provided to the rule optimization engine 230 which performs the linear programming based rule induction from the tuples extracted from the input knowledge graph.

The rule optimization engine 230 has a rule generation engine 232 that generates an initial set of rules from the initial set of extracted tuples and structure information. The rule generation engine 232 generates an initial set of rules from these tuples and structure information of the knowledge graph by applying one or more heuristics to these tuples and structure information. In some illustrative embodiments, the heuristics include a first heuristic that generates rules of length 1 or 2, meaning that the number of relations present in the clause of each rule is limited to 1 or 2. The heuristic favors rules that create many paths between tail nodes and end nodes of edges labeled with the relation being considered.

In some illustrative embodiments, a second heuristic may be implemented by the rule generation engine 232, either in addition to the first heuristic, or in replacement of the first heuristic, which takes each tail entity in the tuples of the input knowledge graph that have the relation being considered, and determines a shortest path to each head entity. If the length of this shortest path is not larger than the pre-determined maximum length, then the path may be added as part of the initial rules, where the path is defined by a sequence of relations labeling edges that link the tail entity to the head entity. For example, if the pre-determined maximum length value is 3, then paths having a maximum of 3 relations are selected from the tuples and structure information extracted from the knowledge graph. Each rule generated through one or more of these heuristics has a variable $w_k$ that is added to the linear programming problem, and whose actual value is learned through solving the linear programming problem.

It should be appreciated that these are only examples of heuristics that may be used to generate the initial set of rules and other heuristics may be used without departing from the spirit and scope of the present invention. Any suitable methodology and logic for generating an initial set of rules based on the extracted tuples and structure information from the input knowledge graph may be used. In addition, rules generated by any other exterior system and previously stored in the rules and weights database 262 can be used.

Thus, the rule generation engine 232 generates an initial set of rules that serve as a basis for building the final rule set through the linear programming based rule induction operations of the illustrative embodiments, performed on the information extracted from the input knowledge graph. It should be appreciated that the rules generated by the rule generation engine 232, either as the initial set of rules or as the iteratively augmented set of rules and final set of rules generated during the linear programming based rule induction operation, may be stored in the rules and weights database 262. The final set of rules, and their associated weights, stored in the rules and weights database 262 may then be used for providing output to downstream computing systems, updating the knowledge graph to include missing or non-represented relations, or the like.

Based on the initial set of rules and their weights, the rule generation engine 232 generates additional candidate rules for adding to the initial set of rules. These additional rules may be added by performing a similar operation as described with regard to the second heuristic, e.g., a shortest path evaluation from tail entities to head entities, but with a modification that uses dual variable values associated with the optimal solution of the linear programming problem of the previous iteration. Each dual variable is associated with a constraint of the linear programming model instance as discussed hereafter and that constraint is associated with a particular edge with tail node t and head node h. The dual variables' values are sorted in decreasing order. Going through the sorted list of dual variables, for each dual variable a rule is generated by computing the shortest path between nodes t and h of the edge associated with that dual variable and using the sequence of relations in that path to define the clause of the rule. The generation of the rule is followed by the computation of the corresponding reduced cost. If the reduced cost is negative, then the rule is added to the set of rules since a negative reduced cost is an indication that the addition of the rule to the linear programming problem may reduce the linear programming solution value.

The resulting expanded set of rules is then provided to the rule selection engine 234 that generates a linear programming based rule induction (LPR) computer model instance and solves a linear programming problem using linear programming techniques while minimize an objective function or cost of the LPR computer model instance. The LPR computer model is an optimization model which comprises a set of variables that are unknown, a set of linear constraints, which are linear functions of the variable constrained to take certain values, and a linear objective function, which is a linear function of the variables which is to be minimized or maximized, depending on the implementation. Solving the linear programming problem means finding the best values of the variables such that the constraints are satisfied and the objective function is minimum (or maximum). For example, in some illustrative embodiments, an LPR computer model instance may comprise logic for implementing the functions defined by equations (3)-(6) described hereafter with regard to the algorithmic detailed description. In those equations, for each rule k, there is a corresponding variable $w_k$ which can take values between zero and one. By solving the linear programming problem, one finds the optimal values for each variable $w_k$. If the optimal value of variable $w_k$ is zero, then rule k is not selected as a part of the final set of rules, otherwise rule k is selected.

This process may be performed iteratively by the rule generation engine 232 and rule selection engine 234 for each relation in the relation set. Having identified the set of rules for each relation, the optimal hyperparameters are identified, a new linear programming problem is generated using the optimal hyperparameters, and is solved in a similar manner as discussed above to generate the final set of rules and corresponding weights.

For example, as each variable $w_k$ in the LPR computer model, e.g., see equations (3)-(6) hereafter which represent one example of a LPR computer model, corresponds to a rule. For example, assume that variable $w_1$ corresponds to the rule (X, Capital_of, Y)→(X, Part_of, Y). Note that this rule does not appear in the equations (3)-(6), but that the rule is represented in equations (3)-(6) by the variable $w_1$. Now assume that variable $w_2$ corresponds to the rule (X, Capital_of, Y) and (Y, Part_of, Z)→(X, Part_of, Z). After solving the linear programming problem (e.g., equations 3-6) via a LP Solver, the values of $w_1$ and $w_2$ may be determined to be $w_1$=0.5 and $w_2$=0. The rules corresponding to variables that take value 0 are not selected, all others are selected. This means by solving the linear programming problem, one can arrive at the conclusion that rule 1 should be selected (since $w_1$>0) but not rule 2 (since $w_2$=0).

The resulting optimal set of rules and weights are then output for this relation, and if additional relations are present in the set of relations, then the process may be repeated by the rule generation engine 232 and rule selection engine 234. Thus, for each relation, corresponding optimal sets of rules may be automatically generated through a linear programming based rule induction operation performed by the rule optimization engine 230 on the tuples and structure information extracted from the input KG database 260.

The main control logic 220, in response to generation of the final rule sets for one or more of the relations in the relation set, may generate an output for specifying the generated rules and weights. For example, in some illustrative embodiments, the main control logic 220 may invoke the downstream computer system interface 250 to generate one or more graphical user interfaces 270 that present the final rule sets and weights to authorized users for review and implementation. In some illustrative embodiments, the downstream computing system interface 250 may output the final rule set and weights to downstream artificial intelligence (AI) computing systems, machine learning computing systems, and the like for use in training the computer models, e.g., machine learning computer models such as neural networks and the like. In some cases, the rules of the final rule set may be applied to knowledge graphs to extract or identify relationships in the knowledge graphs, which may include missing or non-represented relationships and input those extracted relationships as input to the AI or machine learning computer models as training, testing, or runtime inputs, depending on the particular implementation. In some illustrative embodiments, the main control logic 220 may invoke a knowledge graph update engine 290 to update or modify the input knowledge graph(s) from the knowledge graph database 260 by applying the final set of rules to the knowledge graph(s) and identifying missing or non-represented relations. The identified missing or non-represented relations may be added to the knowledge graph as corresponding tuples, sequences or chains of tuples, or the like, so that the previously missing or non-represented relations are present and represented in the updated knowledge graph(s).

The following provides a more detailed discussion of the improved computing tool operations/functionality from an algorithmic perspective. Initially, it should be appreciated that a goal of the operation of the improved computing tool of the illustrative embodiments, and specifically the LP based computer model of the improved computing tool, is to create a weighted combination of first-order logic rules to be used as a prediction function for the task of knowledge graph link prediction. In principle, the LP based computer model has exponentially many variables corresponding to the exponentially many possible rules, but the LP based computer model mechanisms of the illustrative embodiments implement a column generation functionality to address this exponential issue. As noted above, the LP based computer model starts with a small set of candidate rules, generated by the rule generation engine 232, finds the important rules and associated weights, via the operation of the rule selection engine 234, and then generates additional rules, via the rule generation engine 232, that have the potential to improve the overall rule set. Thus, the previously generated rules influence the generation of new rules, and the illustrative embodiments provide a mechanism that iteratively improves the rules that are used to identify new relations between entities present in a knowledge graph and improve the facts represented in the knowledge graph by automated augmenting and updating of the knowledge graph.

To illustrate the operation of the illustrative embodiments, assume a KG, such as input from the KG dataset 260, that comprises a set of entities V and a set of n binary relations $\mathcal{R}$ defined over the domain V. A knowledge graph represents a collection of facts $\mathcal{F} \subseteq V \times \mathcal{R} \times V$ as a labeled, directed multigraph $\mathcal{G}$. Let $\mathcal{F} = \{(t^i, r^i, h^i): i=1, \ldots |\mathcal{F}|\}$, where $t^i \neq h^i \in V$, and $r^i \in \mathcal{R}$, and t is a tail entity (node), h is a head entity (node), and r is a relation with an edge directed from the head entity to the tail entity. Thus, the nodes of the directed multigraph $\mathcal{G}$ correspond to entities in $\mathcal{F}$, and the edges to facts in $\mathcal{F}$. If (t, r, h) is a fact in $\mathcal{F}$, then $\mathcal{G}$ has a directed edge (t, h) labeled by the relation r. Let E stand for the list of directed edges in $\mathcal{G}$. For each fact (t, r, h), it is stated that r(h, t) is true, i.e., the relation r between (h, t) does in fact exist, as it is already represented in the knowledge graph $\mathcal{G}$. Practical knowledge graphs are assumed to be incomplete, i.e., not all missing facts that can be defined over V and $\mathcal{R}$ are assumed to be incorrect.

The knowledge graph link prediction task performed by the illustrative embodiments consists of taking an input knowledge graph, e.g., from 260 in FIG. 2, and then answering a list of queries of the form (t, r, ?) and (?, r, h), constructed from facts (t, r, h) in a test set. The query (t, r, ?) means that a tail entity t and a relation r are given as input, and the goal is to find a head entity h such that (t, r, h) is a fact, i.e., is true. To evaluate these queries, a collection of facts $\mathcal{F}$ is divided into a training set $\mathcal{F}_{tr}$, a validation set $\mathcal{F}_v$, and a test set $\mathcal{F}_{te}$, the knowledge graph $\mathcal{G}$ corresponding to $\mathcal{F}_{tr}$ is constructed and a link prediction function is learned from the knowledge graph $\mathcal{G}$ and evaluated on the test set.

A goal of the knowledge graph link prediction task is, for each relation r in knowledge graph $\mathcal{G}$, to find a set of closed, chain-like (chains of relations) rules $R_1, \ldots, R_p$ and positive weights $w_1, \ldots, w_p$, where each rule $R_i$ has the form:

$$r_1(X,X_1) \wedge r_2(X_1,X_2) \wedge \ldots \wedge r_l(X_{l-1},Y) \rightarrow r(X,Y) \qquad (1)$$

Here $r_1, \ldots, r_l$ are relations from $\mathcal{R}$ represented in the knowledge graph $\mathcal{G}$ and the length of the rule is l. The interpretation of this rule is that if, for some entities (nodes) X, Y of $\mathcal{G}$, there exists entities $X_1, \ldots, X_l$ of $\mathcal{G}$ such that $r_1(X, X_1)$, $r_l(X_{l-1}, Y)$ and $r_j(X_{j-1}, X_j)$ are true for j=2, \ldots, l-1, then r(X, Y) is true. In other words, if there is a relational path in $\mathcal{G}$ that links X to Y, then the relation r from X to Y is considered true. The conjunction of the relations in equation (1) is the "clause" associated with the rule $R_i$, i.e., $r_1(X, X_1) \wedge r_2(X_1, X_2) \wedge \ldots \wedge r_l(X_{l-1}, Y)$ is the clause for rule $R_i$. Thus, each clause $C_i$ is a function from V×V to {0, 1}, and $|C_i|$ is the number of relations in $C_i$, e.g., $r_1, r_2$, etc., are each "relation". Thus, $C_i(X, Y)=1$ for entities X, Y in $\mathcal{G}$ if and only if there is a relational path of the form $$X \xrightarrow{r_1} X_1 \ldots X_{l-1} \xrightarrow{r_l} Y.$$

The learned prediction function for relation r is:

$$f_r(X,Y) = \Sigma_{i=1}^{p} w_i C_i(X,Y) \text{ for all } X,Y \in V \qquad (2)$$

The weights are calculated by solving the linear programming problem (e.g., see equations (3) to (6) hereafter). Equation (2) provides a score for the set of p rules (rules $R_1, \ldots, R_p$), which essentially is the sum of the weights for all the rules for which $C_i(X, Y)=1$.

Given a query (t, r, ?), constructed from a fact (t, r, h) from the test set, a score $f_r(t, v)$ is calculated for every entity $v \in V$, and the rank of the correct entity h is calculated from the scores of all entities in the filtered set. In the filtered set, the scores of the entities $v \in V$ for which the directed edge (t, v) labeled by the relation r exists in knowledge graph $\mathcal{G}$ are not considered in the ranking. Similar operations may be performed to calculate the rank of the tail entities t for the query (?, r, h).

Once all ranks of the head and tail entities for the queries constructed from all facts containing the relation r in the test set are calculated, standard metrics such as the mean reciprocal rank (MRR) are calculated. The MRR is defined as the average of the reciprocal ranks. An issue in the rank computation is that multiple entities (say e' and e") can get the same score for a given query. Different treatment of equal scores can lead to significantly different MRR values. Thus, in accordance with one illustrative embodiment, a random break ranking may be utilized, where the correct entity is compared against all entities and any ties in scores are broken randomly.

To further explain the LP based computer model, implemented by the rule optimization engine 230, for rule learning for knowledge graph (KG) link prediction, assume that K denotes the set of possible rules of the form set forth in equation (1) above, with a maximum rule length L. The size of K is equal to $n^L$, i.e., $|K|=n^L$, where n is the number of relations.

Consider a relation r, and let $E_r$ be the set of edges in the knowledge graph $\mathcal{G}$ with a label r, corresponding to relation r, and assume that $|E_r|=m$, i.e., the total number of edges labeled r. Let the ith edge in $E_r$ be $(X_i, Y_i)$. The rule selection engine 234 computes a coefficient $a_{ik}$ as $a_{ik}=C_k(X_i, Y_i)$. That is, $a_{ik}$ is 1 if there is a relational path associated with the clause $C_k$ from $X_i$ to $Y_i$, and is 0 otherwise. Furthermore, let $neg_k$ be a number associated with the number of "nonedges" (X', Y') from (V×V)\$E_r$ for which $C_k(X', Y')=1$. $Neg_k$ is calculated for the kth rule as follows, where k is a value 1, 2, 3, \ldots, |K|, and refers to a generic rule, while K refers to the set of possible rules (each rule has one clause, so when the present description references "rule k" or the kth rule, this is also referencing "clause k").

The tail node t and head node h for each edge in $E_r$ are considered. The set of nodes S is computed which is the set of nodes that can be reached by a path induced by the kth rule starting at the tail. If there is no edge from t to a node v in S labeled by r, it is determined that v is an invalid end-point. Let $right_k$ be the set of such invalid points, i.e., end-points that do not have an edge starting at node t labeled by r. Similarly, the set $left_k$ of invalid start-points is calculated based on paths ending at h induced by the kth rule. The total number of invalid start and end points for all tail and head nodes associated with edges in $E_r$ is $neg_k=|right_k|+|left_k|$. For a query of the form (t, r, ?), where t is a tail node of an edge in $E_r$, the prediction function defined by the kth rule alone gives a positive and equal score to all nodes in $right_k$. That is, the nodes are invalid but if the score function (equation (2)) is applied considering only rule k (i.e., remove the sum from the formula and set i=k), one obtains a positive score for all invalid points (the score is the same for all nodes because $C_k(X, Y)=1$ for all invalid nodes and $w_k$ is constant). This means that this rule is not very good at predicting because it is producing positive scores for invalid points.

With this understanding, the following inequality constraints comprise the LPR computer model for rule learning or induction in accordance with one or more illustrative embodiments:

$$z_{min} = \min \Sigma_{i=1}^m \eta_i + \tau \Sigma_{k \in K} neg_k w_k \quad (3)$$

$$s \cdot t \cdot \Sigma_{k \in K} a_{ik} w_k + \eta_i \geq 1 \text{ for all } i \in E_r \quad (4)$$

$$\Sigma_{k \in K} (1+|C_k|) w_k \leq \kappa \quad (5)$$

$$w_k \in [0,1] \text{ for all } k \in K \quad (6)$$

This LPR computer model contains two sets of variables: the variables $\eta_i$ where i=1, . . . , m and the variables $w_k$ where $k \in K$. The variable $\eta_i$ is positive if the prediction function defined by variables $w_k$ with positive values gives a value less than 1 to the ith edge in $E_r$. The continuous variable $w_k$ is restricted to the range [0, 1], and is positive if and only if clause $k \in K$ is a part of the prediction function (2), i.e., having $w_k=0$ is equivalent to not having $C_k(X, Y)$ in the prediction function (2) since multiplying $w_k$ by $C_k(X, Y)$ gives 0. In other words, the $w_k$ variables with positive value define the function (2). Solving the linear programming problem means finding the optimal values for the variables $\eta_i$ and $w_k$ such that the objective function (3) is minimized and the constraints (4) to (6) are satisfied.

The objective function (3) consists of two parts. The $\Sigma_{i=1}^m \eta_i$ portion attempts to maximize $\Sigma_{i=1}^m \min\{f_r(X_i, Y_i), 1\}$, i.e., this portion attempts to approximately maximize the number of facts in $E_r$ that are given a "high-score" of 1 by $f_r$. The other portion consists of the hyperparameter $\tau$ multiplied by $\Sigma_k neg_k w_k$. The value of $\Sigma_k neg_k w_k$ is the sum of scores given by $f_r$ to all nodes in $right_k$ and $left_k$. The hyperparameter $\tau > 0$ represents a tradeoff between how well the weighted combination of rules performs on the known facts (the $\Sigma_{i=1}^m \eta_i$ term), and how poorly it performs on some negative samples or "unknown" facts (the $\Sigma_k neg_k w_k$ term).

Constraints (4) are defined for all edges $i \in E_r$. The constraint for the ith edge in $E_r$ states that the prediction function defined by variables $w_k$ with positive values plus the variable $\eta_i$ must be at least 1. Constraint (5) imposes an upper bound on the complexity of the prediction function, where complexity is defined as the number of clauses plus the numbers of relations across all clauses. The upper bound is the hyperparameter $\kappa$, and therefore the complexity the prediction function cannot exceed the value of $\kappa$. Finally, constraints (6) restrict the values of the variables $w_k$ to the range [0, 1].

It is impractical to solve the linear programming problem defined by equations (3) to (6) given the exponentially many variables $w_k$, except when n and L are both small. However, an effective way to deal with such large linear programming problems is to use column generation where only a small subset of all possible $w_k$ variables is generated explicitly, and the optimality of the linear programming problem is guaranteed by iteratively solving a pricing problem. However, the LPR operations do not have to be solved to optimality in the illustrative embodiments.

The column generation operation starts with the generation of an initial set of candidate rules $K_0 \subset K$ (i.e., a subset of the set K of possible rules of the form set forth in equation (1) above, with a maximum rule length L). The linear programming problem defined by equations (3) to (6) where K is replaced by $K_0$ (which will be denoted by $LP_0$) is solved producing an optimal objective function value $z_{min_0}$. Then, taking into account the solution of the linear programming problem, new rules are generated and a new set $K_1$ is created by the union of $K_0$ with the set of new rules. The linear programming problem defined by equations (3) to (6) where K is replaced by $K_1$ (which will be denoted by $LP_1$) is solved producing an optimal objective function value $z_{min_1}$. Since $K_0 \subset K_1$ it is clear that a solution of $LP_0$ is a solution of $LP_1$, and therefore $z_{min_1} \leq z_{min_0}$. However, the goal is to have $z_{min_1} < z_{min_0}$ so that by increasing the number of rules considered in the linear programming problem the optimal objective function value decreases. That goal can be achieved by considering the dual solution associated with an optimal solution of $LP_0$, and then trying to find a negative reduced cost rule. The process described in this paragraph is repeated where the set of candidate rules is augmented to create sets $K_i$ such that $K_0 \subset K_1 \subset \ldots \subset K$.

To set up $K_0$ and the associated $LP_0$, two heuristics are developed. In a first heuristic, rules of lengths one and two are generated. For length one rules, a one-relation rule is created from a relation in $\mathcal{R}\setminus\{r\}$ if it labels a large number of edges from tail nodes to head nodes of edges in $E_r$. Similarly, to create rules of length two, each edge (X, Y) in $E_r$ is considered and the relations from edges (X, Z) in $E\setminus E_r$ and (Z, Y) in E are selected to create a rule, again taking into account how frequently a length two rule creates paths from the tail nodes to head nodes of edges in $E_r$.

In a second heuristic, each edge (X, Y) in $E_r$ is considered and a shortest path from X to Y contained in the edge set $E\setminus\{(X, Y)\}$ is found where the path length is bounded by a pre-determined maximum length. The sequence of relations associated with the shortest path is then used to generate a rule. Another rule is generated by considering a path of length at least one more than the shortest path. Other methods for generating rules, as will be readily apparent to those of ordinary skill in the art in view of the present description, may be used to generate $K_0$ without departing from the spirit and scope of the present invention.

When adding new rules, each set $K_i$ for i>0 is constructed by adding the new rules to the set $K_{i-1}$. A modified version of the second heuristic above may be used to generate the additional rules. In this modified version of the heuristic, the dual variable values associated with the optimal solution of $LP_{i-1}$ may be used. That is, let $\delta_i \geq 0$ for all $i \in E_r$ be dual variables corresponding to the constraints set forth in equation (4) above. Let $\lambda \leq 0$ be the dual variable associated with the constraints set forth in equation (5) above. Given a variable $w_k$ which is zero in a solution of $LP_i$ and associated dual solution values of $\overline{\delta}$ and $\overline{\lambda}$, the reduced cost $red_k$ for this variable is given by:

$$red_k = \tau neg_k - \Sigma_{i \in E_r} a_{ik} \overline{\delta}_i - (1+|C_k|)\overline{\lambda} \quad (7)$$

If $red_k < 0$, then increasing $w_k$ from zero may reduce the LP solution value. Using the reduced cost formulation above with regard to equation (7), once a rule is generated, e.g., rule k, then values corresponding to rule k may be input to the reduced cost equation (7) to obtain the value of the reduced cost for that rule k. If the value of the reduced cost $red_k$ is less than 0, then that rule is added to the rule set; otherwise, that rule is discarded.

In accordance with at least one illustrative embodiment, an approach used to make the reduced cost negative is to sort the dual values $\bar{\delta}_j$ in decreasing order, and then go through the associated indices j, and create rules k such that $a_{jk}=1$ via a shortest path calculation. That is, the illustrative embodiments may take the corresponding edge (X, Y) in $E_r$, find the shortest path between X and Y and generate a new rule with the sequence of relations in that path. In this version of the heuristic, the number of rules generated is limited so that $K_i$ is only slightly larger than $K_{i-1}$, where the particular limit may be implementation dependent and determined empirically to achieve a better solution, where "better" means faster or leading to improved results. For example, in one illustrative embodiment, the number of rules generated may be limited such that $|K_i|-|K_{i-1}|\leq 10$. The dual values are used to indicate which facts are not currently implied by the existing set of chosen rules. If the reduced cost of a new rule is non-negative, then the clause corresponding to that rule is not added to $K_{i-1}$.

Thus, the mechanisms of the illustrative embodiments provide an automated improved computing tool and improved computing tool operations/functionality for automatically generating a set of rules and corresponding weights for identifying relations in knowledge graphs which may expose missing and/or non-represented relationships between entities of the knowledge graphs. The resulting rules and weights may be applied to knowledge graph inputs to identify such missing or non-represented relationships so that they may be provided as input to downstream computing systems, such as AI computing systems, machine learning computer models, or the like, for training, testing, or runtime operations. The illustrative embodiments provide such improved computing tools and functionality which have improved scaling with KG size over other approaches and provides significantly improved running time than other approaches. The rule-based mechanisms of the illustrative embodiments provide improved interpretability solutions than embedding based approaches, and promotes interpretability by adding a constraint on the LP model limiting the complexity of the selected rule set, with this complexity constraint, or hyperparameter, being tunable to the particular KG dataset.

Figure 3:
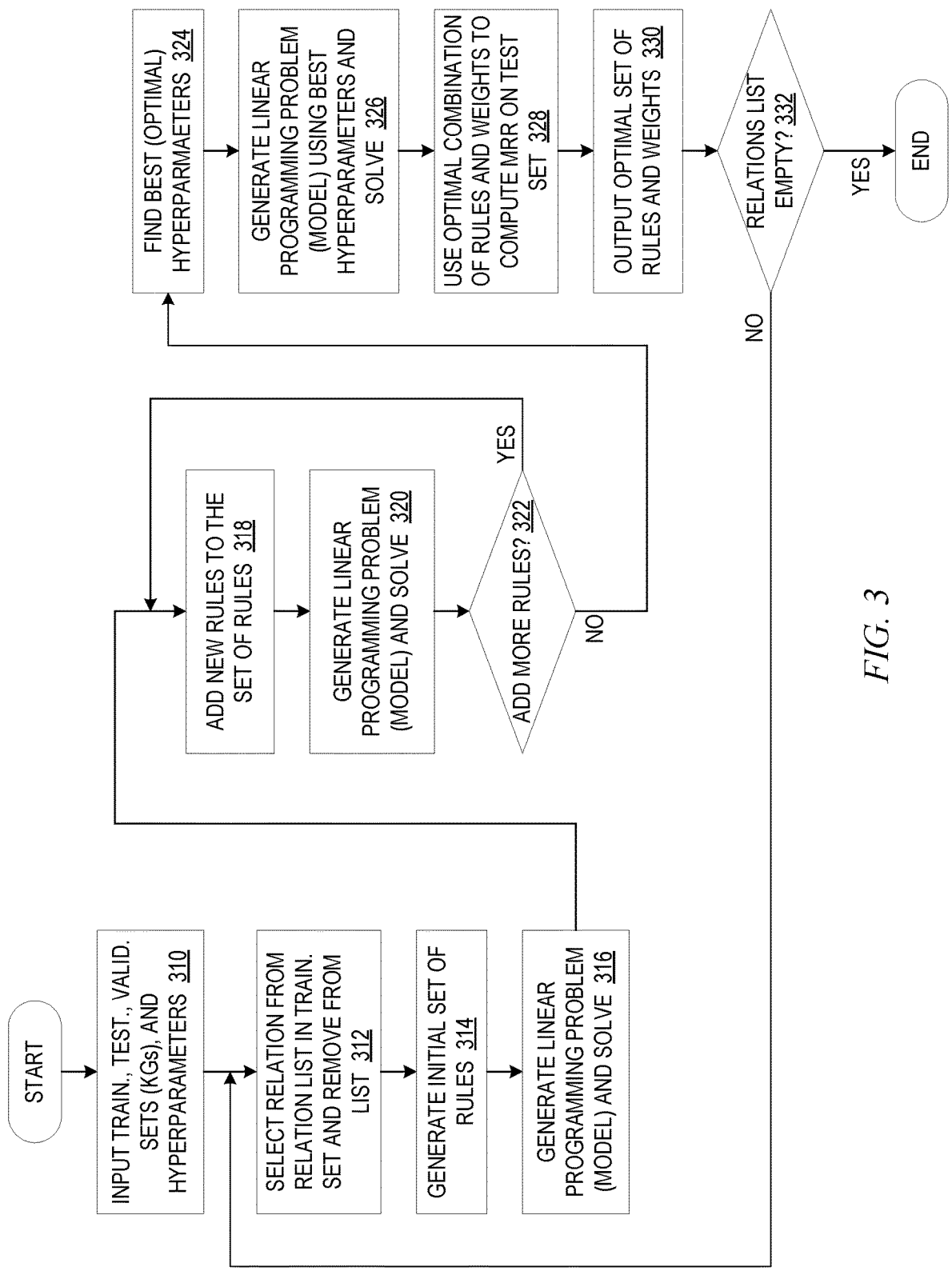
FIG. 3 is a flowchart outlining an example operation for automatically generating a rule set for relation discovery/prediction based on a linear programming based rule induction in accordance with one illustrative embodiment.
Figure 4:
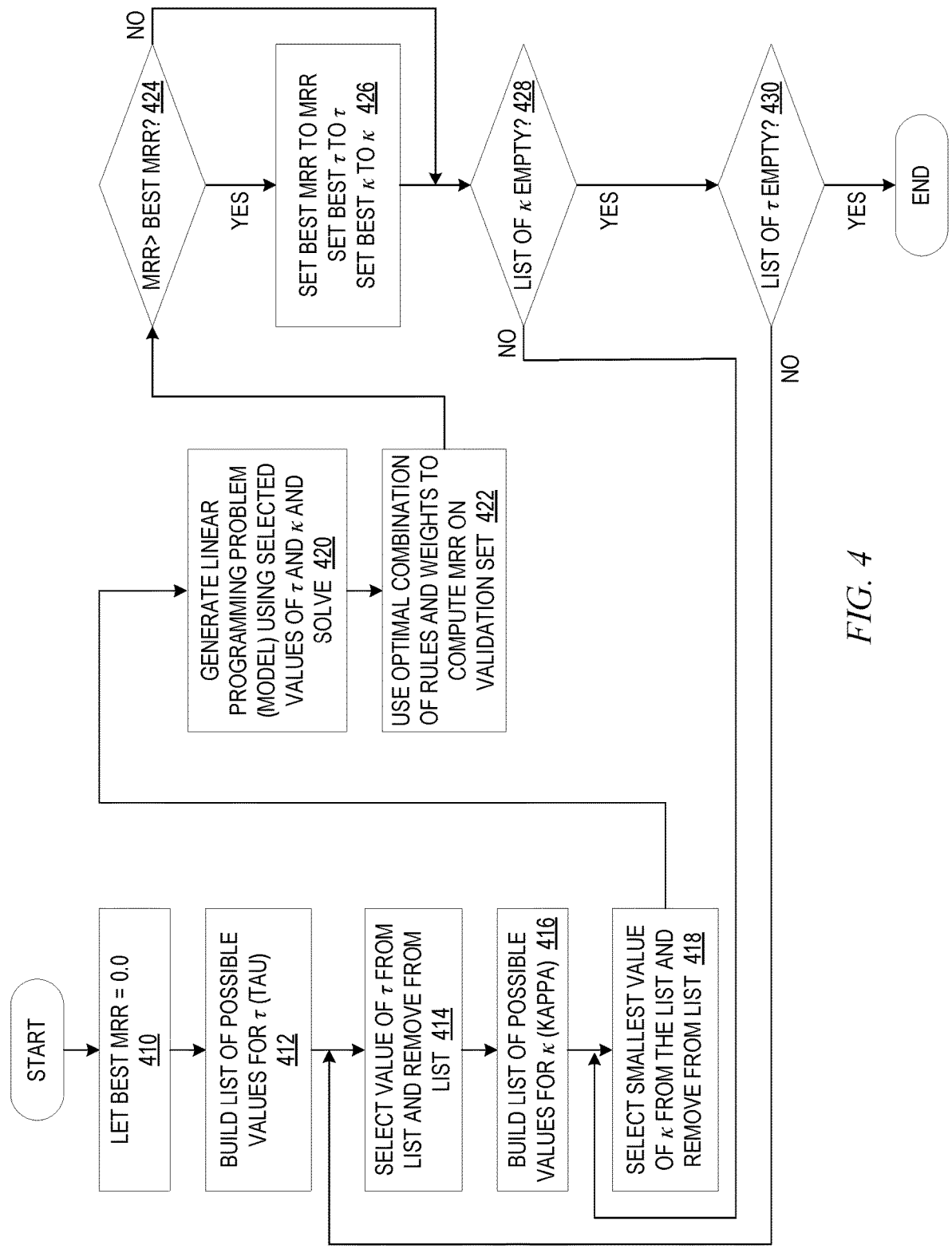
FIG. 4 is a flowchart outlining an example operation for automatically determining optimized hyperparameter values for the linear programming based rule induction in accordance with one illustrative embodiment.

FIGS. 3-4 present flowcharts outlining example operations of elements of the present invention with regard to one or more illustrative embodiments. It should be appreciated that the operations outlined in FIGS. 3-4 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 3-4, and may, in some cases, make use of the results generated as a consequence of the operations set forth in FIGS. 3-4, the operations in FIGS. 3-4 themselves are specifically performed by the improved computing tool in an automated manner.

FIG. 3 is a flowchart outlining an example operation for automatically generating a rule set for relation discovery/prediction based on a linear programming based rule induction in accordance with one illustrative embodiment. As shown in FIG. 3, the operation starts by receiving input data structures comprising hyperparameters and a training, testing, and validation dataset, which may be one or more knowledge graphs, e.g., different portions of the same knowledge graph which is split into a training portion, testing portion, and validation portion (step 310). A relation from a list of all relations in the training set is selected and is removed from the list of all relations (step 312). An initial set of rules is generated for this relation, such as by way of the heuristics mentioned previously (step 314). For this initial set of rules, a linear programming model is generated and solved (step 316). With regard to step 316, the set of rules (clauses) $K_0$ and hyperparameters are input to the mechanisms of the illustrative embodiments and an instance of the LPR computer model, e.g., comprising equations (3) to (6) above, is generated and input to a Linear Programming Solver which solves the linear programming problem and reports the solution. This solution is then used in step 318 hereafter where the values of the dual variables obtained in the solution of the linear programming problem in step 316 are used to generate new rules in step 318 as previously described above, e.g., see the discussion of the modified second heuristic above.

That is, in step 318 one or more new rules are then added to the set, such as by way of the modified second heuristic as discussed above, for example, to generate an expanded rule set (step 318). A linear programming problem is then generated for this expanded rule set and is solved (step 320). A determination is made as to whether more rules should be added to the rule set, e.g., a maximum number of iterations of the operation for expanding the rule set is met (step 322). If so, then the operation returns to step 318 to further expand the rule set. If not, then the rule set for this relation has been generated and the operation proceeds to step 324 where the optimal hyperparameter settings are generated (step 324). The process for finding the optimal hyperparameters is shown in FIG. 4, discussed hereafter.

It should be appreciated that in step 316 and in the iterations of steps 318-322 initial values for the hyperparameters are utilized. At the end of this process there is a large set of rules because each time step 318 is executed more rules are added. When the operation attempts to find the best values for the hyperparameters in step 324 this large set of rules is used and therefore, in step 324 it may be the case that better hyperparameter values are found for those rules than the hyperparameter values that were used in step 316 and in the iterations of steps 318-322 Thus, in step 326 "optimal" subset of rules is selected based on the "better" or optimal hyperparameter settings.

That is, once the optimal hyperparameter settings are generated, a new linear programming model is generated with the optimized hyperparameter settings and is solved (step 326). The resulting optimal combination of rules and weights generated by the solution to the linear programming model is then used to compute a mean reciprocal rank (MRR) on the input test set (step 328). The MRR is a measure that may be output to a user to provide an indication of how good the rules and weights are when applied to a test set, so that one can determine if the rules achieve a desired level of performance. The resulting optimal set of rules and weights are then output (step 330) and a determination is made as to whether the list of relations is empty or not (step 332). If the list of relations is not empty, i.e., there are other relations in the knowledge graph for which rules are to be generated, then the operation returns to step 312 where the next relation from the list is selected and removed and the process repeats for this next relation. If the list of relations is empty, the operation terminates.

As noted above, one operation in FIG. 3 is to determine the optimal settings for the hyperparameters of the linear programming model, i.e., step 324. The operations for identifying the optimal settings of hyperparameters is shown in FIG. 4. That is, FIG. 4 provides a flowchart outlining an example operation for automatically determining optimized hyperparameter values for the linear programming based rule induction in accordance with one illustrative embodiment.

As shown in FIG. 4, the operation starts by setting MRR to zero (step 410). A list of possible values of the tradeoff parameter $\tau$ is generated (step 412). A value of $\tau$ is selected from the list of possible values and removed from the list (step 414). A list of all possible values of $\kappa$ is then generated (step 416). A smallest value of $\kappa$ is selected from this list of possible $\kappa$ values, and removed from the list (step 418). A linear programming model is then generated using the selected values of these hyperparameters $\tau$ and $\kappa$ and is solved (step 420) using a LP Solver or the like.

The optimal combination of rules and weights generated by solving the linear programming model is then used to compute a MRR on a validation set (step 422). A determination is made as to whether the MRR is greater than the currently "best" MRR (step 424). If the MRR is greater than the current best MRR, then the best MRR is set to the value of MRR, and the best hyperparameter values are set to the values of the hyperparameters $\tau$ and $\kappa$ (step 426). A determination is then made as to whether the list of possible $\kappa$ values is empty (step 428). If not, the operation returns to step 418 and selects the next smallest $\kappa$ value from the list and repeats the process. If the list of possible $\kappa$ values is empty, then a determination is made as to whether the list of possible $\tau$ values is empty (step 430). If not, the operation returns to step 414 where the next $\tau$ value is selected from the list and the operation is repeated. If the list of $\tau$ values is empty, then the optimum values for $\tau$ and $\kappa$ have been identified and the operation terminates.

Figure 5:
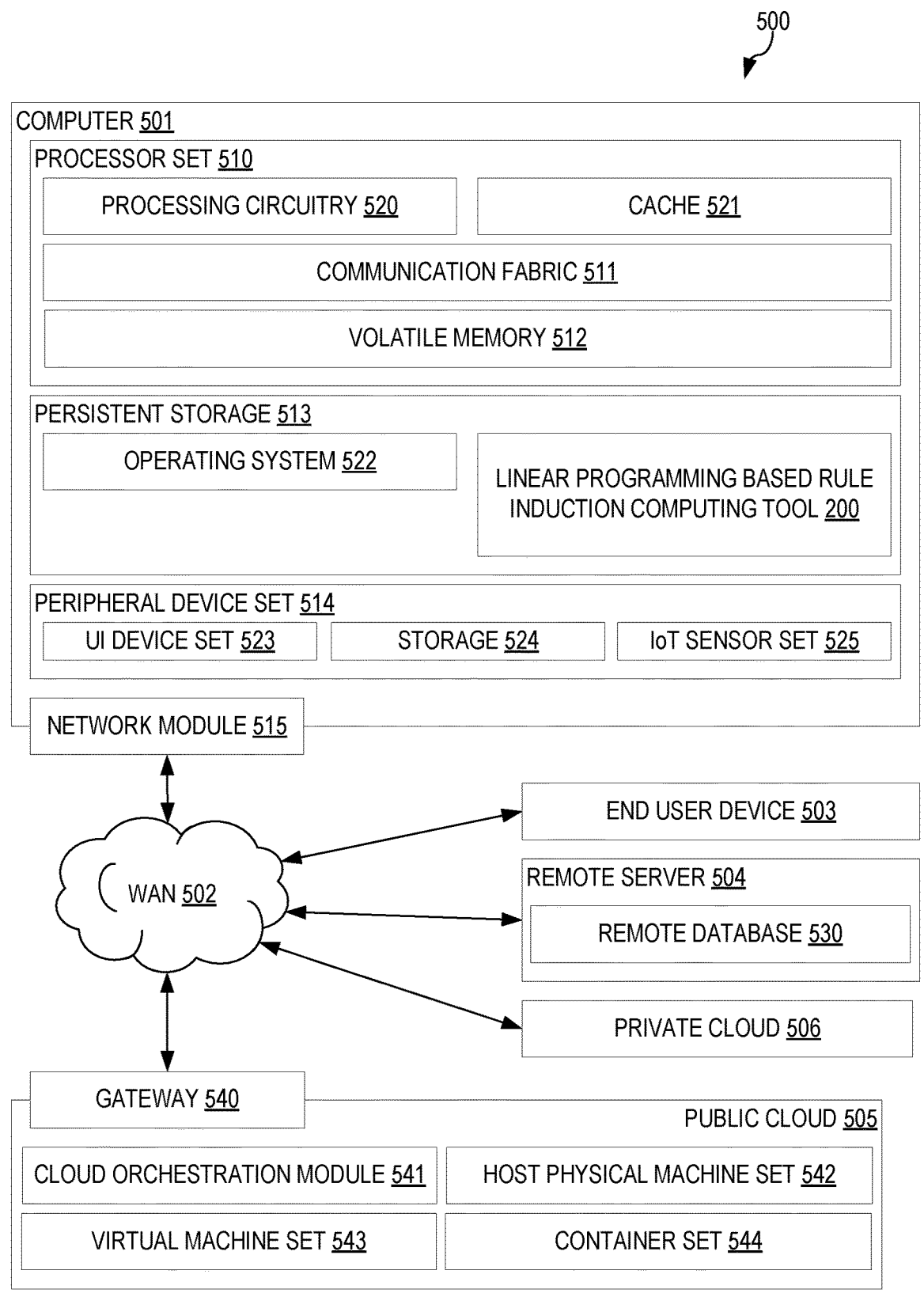
FIG. 5 is an example diagram of a distributed data processing system environment in which aspects of the illustrative embodiments may be implemented and at least some of the computer code involved in performing the inventive methods may be executed.

FIG. 5 is an example diagram of a distributed data processing system computing environment in which aspects of the illustrative embodiments may be implemented and at least some of the computer code involved in performing the inventive methods may be executed. Computing environment 500 contains an example of an environment for the execution of at least some of the computer code involved in performing the inventive methods, such as linear programming based rule induction computing tool 200 from FIG. 2. In addition to block 200, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 200, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

Computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 200 in persistent storage 513.

Communication fabric 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in block 200 typically includes at least some of the computer code involved in performing the inventive methods.

Peripheral device set 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

As shown in FIG. 5, one or more of the computing devices, e.g., computer 501 or remote server 504, may be specifically configured to implement a linear programming based rule induction (LPRI) computing tool in accordance with one or more of the illustrative embodiments described above, e.g., LPRI computing tool 200 in FIG. 2. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 501 or remote server 504, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automated rule set generation for knowledge graph link prediction or relation identification by performing rule induction using linear programming techniques and learning of rules from input knowledge graphs.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
processing, by a linear programming based rule induction computing tool, an input knowledge graph data structure to extract tuples representing relations between entities present in the input knowledge graph data structure;
generating a first set of rules based on one or more heuristics applied to the tuples, wherein a rule of the first set of rules comprises a clause based on one or more relations of the input knowledge graph data structure and an implied relation associated with the input knowledge graph data structure;
identifying, by the linear programming based rule induction computing tool, one or more candidate rules that are candidates for adding to the first set of rules;
evaluating, by the linear programming based rule induction computing tool, a linear programming computer model for a modified set of rules comprising the first set of rules and the one or more candidate rules to determine whether or not adding the one or more candidate rules improves an objective function of the linear programming model; and
expanding, by the linear programming based rule induction computing tool, the first set of rules to include the one or more candidate rules in response to the evaluation of the linear programming computer model indicating that addition of the one or more candidate rules improves the objective function of the linear programming computer model, to thereby generate a second set of rules.

2. The method of claim 1, wherein the one or more heuristics comprise a first heuristic that generates rules of length two or less, where a length of a rule is a number of tuples present in a clause of the rule, and a second heuristic that adds rules with a shortest path between each tail entity and each head entity in tuples of the input knowledge graph data structure.

3. The method of claim 1, wherein the one or more candidate rules are identified based on a shortest path evaluation of pathways between entities in the input knowledge graph data structure.

4. The method of claim 1, wherein evaluating the linear programming computer model comprises:
generating, by a linear programming solver, dual variable values for edges based on the first set of rules and the input knowledge graph data structure;
sorting the edges by decreasing dual variable values; and
for each edge, between each combination of a tail entity and a head entity, applying a shortest path heuristic and computing a reduced cost function based on the sorted edges.

5. The method of claim 4, wherein expanding the first set of rules to include the one or more candidate rules in response to the evaluation of the linear programming model comprises, for each edge between each combination of the tail entity and the head entity, adding a corresponding rule to the first set of rules if the reduced cost function results in a value less than zero.

6. The method of claim 1, wherein identifying one or more candidate rules that are candidates for adding to the first set of rules comprises generating rules based on a first rule limit that limits a number of rules that may be included in the one or more candidate rules, and a second rule limit that limits a number of relations per rule.

7. The method of claim 1, wherein evaluating the linear programming computer model comprises performing the following operations:

$$z_{min} = \min \Sigma_{i=1}^{m} \eta_i + \tau \Sigma_{k \in K} neg_k w_k \quad (3)$$

$$s \cdot t \cdot \Sigma_{k \in K} a_{ik} w_k + \eta_i \geq 1 \text{ for all } i \in E_r \quad (4)$$

$$\Sigma_{k \in K} (1 + |C_k|[\![ \ ]w]\!]_k \leq \kappa \quad (5)$$

$$w_k \in [0,1] \text{ for all } k \in K \quad (6)$$

where i=1, . . . , m, $\eta_i$ is a penalty variable for a corresponding edge $e_i$ in the set of edges $E_r$ labeled by relation r, $w_k$ is a weight value for rule k in the set of rules K, $C_k$ is a clause of rule k, $a_{ik}$ is a coefficient of variable $w_k$ in constraint i, $neg_k$ is a total number of invalid start and end points, $\tau$ is a tradeoff hyperparameter representing a tradeoff between how well a weighted combination of rules performs on known facts and how poorly it performs on negative paths connecting a tail node t to a head node h using a rule k for which there is no direct edge between t and h with relation r, and $\kappa$ is a hyperparameter specifying a maximum complexity of the rules r.

8. The method of claim 1, further comprising applying the second set of rules to the input knowledge graph data structure or another knowledge graph data structure to identify at least one missing relationship not explicitly represented as a relationship in the input knowledge graph data structure or the other knowledge graph data structure.

9. The method of claim 8, further comprising automatically updating the input knowledge graph data structure or other knowledge graph data structure to include the identified at least one missing relationship as an explicitly represented relationship in the input knowledge graph data structure or other knowledge graph data structure, and thereby generate an updated knowledge graph data structure.

10. The method of claim 9, further comprising inputting the updated knowledge graph data structure to a downstream computing system that operates on the updated knowledge graph data structure to perform an artificial intelligence or machine learning operation based on relationships represented in the updated knowledge graph data structure.

11. A computer program product comprising a computer readable storage medium having a computer readable program stored therein, wherein the computer readable program, when executed on a data processing system, causes the data processing system to:

process an input knowledge graph data structure to extract tuples representing relations between entities present in the input knowledge graph data structure;

generate a first set of rules based on one or more heuristics applied to the tuples, wherein a rule of the first set of rules comprises a clause based on one or more relations of the input knowledge graph data structure and an implied relation associated with the input knowledge graph data structure;

identify one or more candidate rules that are candidates for adding to the first set of rules;

evaluate a linear programming computer model for a modified set of rules comprising the first set of rules and the one or more candidate rules to determine whether or not adding the one or more candidate rules improves an objective function of the linear programming model; and expand the first set of rules to include the one or more candidate rules in response to the evaluation of the linear programming computer model indicating that addition of the one or more candidate rules improves the objective function of the linear programming computer model, to thereby generate a second set of rules.

12. The computer program product of claim 11, wherein the one or more heuristics comprise a first heuristic that generates rules of length two or less, where a length of a rule is a number of tuples present in a clause of the rule, and a second heuristic that adds rules with a shortest path between each tail entity and each head entity in tuples of the input knowledge graph data structure.

13. The computer program product of claim 11, wherein the one or more candidate rules are identified based on a shortest path evaluation of pathways between entities in the input knowledge graph data structure.

14. The computer program product of claim 11, wherein evaluating the linear programming computer model comprises:

generating, by a linear programming solver, dual variable values for edges based on the first set of rules and the input knowledge graph data structure;

sorting the edges by decreasing dual variable values; and for each edge, between each combination of a tail entity and a head entity, applying a shortest path heuristic and computing a reduced cost function based on the sorted edges.

15. The computer program product of claim 14, wherein expanding the first set of rules to include the one or more candidate rules in response to the evaluation of the linear programming model comprises, for each edge between each combination of the tail entity and the head entity, adding a corresponding rule to the first set of rules if the reduced cost function results in a value less than zero.

16. The computer program product of claim 11, wherein identifying one or more candidate rules that are candidates for adding to the first set of rules comprises generating rules based on a first rule limit that limits a number of rules that may be included in the one or more candidate rules, and a second rule limit that limits a number of relations per rule.

17. The computer program product of claim 11, wherein evaluating the linear programming computer model comprises performing the following operations:

$$z_{min} = \min \Sigma_{i=1}^{m} \eta_i + \tau \Sigma_{k \in K} neg_k w_k \quad (3)$$

$$s \cdot t \cdot \Sigma_{k \in K} a_{ik} w_k + \eta_i \geq 1 \text{ for all } i \in E_r \quad (4)$$

$$\Sigma_{k \in K} (1 + |C_k|[\![ \ ]w]\!]_k \leq \kappa \quad (5)$$

$$w_k \in [0,1] \text{ for all } k \in K \quad (6)$$

where i=1, . . . , m, $\eta_i$ is a penalty variable for a corresponding edge $e_i$ in the set of edges $E_r$ labeled by relation r, $w_k$ is a weight value for rule k in the set of rules K, $C_k$ is a clause of rule k, $a_{ik}$ is a coefficient of variable $w_k$ in constraint i, $neg_k$ is a total number of invalid start and end points, $\tau$ is a tradeoff hyperparameter representing a tradeoff between how well a weighted combination of rules performs on known facts and how poorly it performs on negative paths connecting a tail node t to a head node h using a rule k for which there is no direct edge between t and h with relation r, and κ is a hyperparameter specifying a maximum complexity of the rules r.

18. The computer program product of claim 11, further comprising applying the second set of rules to the input knowledge graph data structure or another knowledge graph data structure to identify at least one missing relationship not explicitly represented as a relationship in the input knowledge graph data structure or the other knowledge graph data structure.

19. The computer program product of claim 18, further comprising automatically updating the input knowledge graph data structure or other knowledge graph data structure to include the identified at least one missing relationship as an explicitly represented relationship in the input knowledge graph data structure or other knowledge graph data structure, and thereby generate an updated knowledge graph data structure.

20. An apparatus comprising:
at least one processor; and
at least one memory coupled to the at least one processor, wherein the at least one memory comprises instructions which, when executed by the at least one processor, cause the at least one processor to:
process an input knowledge graph data structure to extract tuples representing relations between entities present in the input knowledge graph data structure;
generate a first set of rules based on one or more heuristics applied to the tuples, wherein a rule of the first set of rules comprises a clause based on one or more relations of the input knowledge graph data structure and an implied relation associated with the input knowledge graph data structure;
identify one or more candidate rules that are candidates for adding to the first set of rules;
evaluate a linear programming computer model for a modified set of rules comprising the first set of rules and the one or more candidate rules to determine whether or not adding the one or more candidate rules improves an objective function of the linear programming model; and
expand the first set of rules to include the one or more candidate rules in response to the evaluation of the linear programming computer model indicating that addition of the one or more candidate rules improves the objective function of the linear programming computer model, to thereby generate a second set of rules.

* * * * *